United States Patent
Schmitt et al.

(10) Patent No.: US 7,302,676 B2
(45) Date of Patent: **\*Nov. 27, 2007**

(54) METHOD FOR DEBUGGING FLOWCHART PROGRAMS FOR INDUSTRIAL CONTROLLERS

(75) Inventors: Regina Schmitt, Erlangen (DE); Peter Wagner, Hersbruck (DE)

(73) Assignee: Siemens Aktiengesellschaft, Munich (DE)

( * ) Notice: Subject to any disclaimer, the term of this patent is extended or adjusted under 35 U.S.C. 154(b) by 164 days.

This patent is subject to a terminal disclaimer.

(21) Appl. No.: 09/912,128

(22) Filed: Jul. 24, 2001

(65) Prior Publication Data

US 2002/0046397 A1 Apr. 18, 2002

(30) Foreign Application Priority Data

Aug. 7, 2000 (DE) ................. 100 38 439
Aug. 7, 2000 (DE) ................. 100 38 440
Aug. 7, 2000 (DE) ................. 100 38 441

(51) Int. Cl.
G06F 9/44 (2006.01)
G06F 11/00 (2006.01)

(52) U.S. Cl. .............. 717/132; 717/127; 717/129; 714/38

(58) Field of Classification Search ........ 717/124–149, 717/162–166; 708/290; 700/20; 714/38
See application file for complete search history.

(56) References Cited

U.S. PATENT DOCUMENTS

| 3,668,653 | A | | 6/1972 | Fair et al. |
| 4,074,281 | A | | 2/1978 | Quarton |
| 4,646,228 | A | | 2/1987 | Ikeda |
| 4,682,278 | A | * | 7/1987 | Marquardt et al. ............ 363/58 |
| 4,837,722 | A | * | 6/1989 | Sara ............................ 708/290 |
| 4,852,047 | A | | 7/1989 | Lavallee et al. |
| 4,858,101 | A | | 8/1989 | Stewart et al. |
| 5,321,603 | A | | 6/1994 | Schwenke |
| 5,392,207 | A | | 2/1995 | Wilson et al. |
| 5,434,489 | A | | 7/1995 | Cheng et al. |
| 5,479,354 | A | | 12/1995 | Hussiein |
| 5,485,620 | A | * | 1/1996 | Sadre et al. ................. 717/162 |
| 5,508,909 | A | | 4/1996 | Maxwell et al. |
| 5,563,526 | A | * | 10/1996 | Hastings et al. .............. 326/37 |
| 5,790,437 | A | | 8/1998 | Schuh et al. |
| 5,801,942 | A | | 9/1998 | Nixon et al. |

(Continued)

FOREIGN PATENT DOCUMENTS

DE 196 00 882 C1 9/1997

(Continued)

OTHER PUBLICATIONS

"ISaGRAF Overview" by AlterSys Inc., Mar. 2001.*

(Continued)

*Primary Examiner*—Tuan Dam
*Assistant Examiner*—Chuck Kendall
(74) *Attorney, Agent, or Firm*—White & Case LLP

(57) ABSTRACT

A method for debugging flowchart based computer programs for industrial controllers, in particular motion controllers, wherein suspend commands are assigned to the graphical elements. Through the use of a task control mechanism in the run time system, the user may debug the program on the flowchart level, using a single-step mode and/or a breakpoint mode.

24 Claims, 8 Drawing Sheets

U.S. PATENT DOCUMENTS

| | | | |
|---|---|---|---|
| 5,841,654 A | | 11/1998 | Verissimo et al. |
| 5,909,372 A | | 6/1999 | Thybo |
| 5,926,176 A | * | 7/1999 | McMillan et al. ........... 345/764 |
| 5,956,479 A | * | 9/1999 | McInerney et al. ........... 714/38 |
| 6,055,369 A | * | 4/2000 | Sawahata et al. ........... 717/109 |
| 6,144,984 A | | 11/2000 | DeBenedictis et al. |
| 6,144,993 A | | 11/2000 | Fukunaga et al. |
| 6,263,487 B1 | | 7/2001 | Stripf et al. |
| 6,282,699 B1 | | 8/2001 | Zhang et al. |
| 6,289,252 B1 | | 9/2001 | Wilson |
| 6,294,891 B1 | | 9/2001 | McConnell et al. |
| 6,295,606 B1 | * | 9/2001 | Messerges et al. ........... 713/189 |
| 6,412,106 B1 | * | 6/2002 | Leask et al. ................. 717/124 |
| 6,442,442 B1 | | 8/2002 | Weinhofer |
| 6,466,827 B1 | | 10/2002 | Stine |
| 6,553,268 B1 | | 4/2003 | Schwenke et al. |
| 6,571,138 B1 | | 5/2003 | Okada et al. |
| 6,571,273 B1 | | 5/2003 | Shirai et al. |
| 6,981,226 B2 | * | 12/2005 | Schmitt et al. ............. 715/764 |
| 7,000,191 B2 | * | 2/2006 | Schmitt et al. ............. 715/764 |
| 2002/0046397 A1 | * | 4/2002 | Schmitt et al. ............. 717/125 |
| 2002/0054098 A1 | * | 5/2002 | Schmitt et al. ............. 345/762 |
| 2002/0054099 A1 | * | 5/2002 | Schmitt et al. ............. 345/762 |

FOREIGN PATENT DOCUMENTS

| | | |
|---|---|---|
| EP | 0531 653 A2 | 3/1993 |
| EP | 0 774 701 A1 | 11/1995 |
| EP | 0 735 444 A2 | 3/1996 |
| EP | 0 813 131 A1 | 6/1997 |
| WO | WO92/02871 | 2/1992 |
| WO | WO97/12301 | 3/1997 |
| WO | WO97/25661 | 7/1997 |

OTHER PUBLICATIONS

"Siemens Industrial Software" by E&M Products, Apr. 2001.*

"PLCopen: Standardization in Industrial Control Programming" by Eelco van der Wal, Oct. 1999.*

"ISaGRAF Target for QNX6" by Pavel Kabanov, Nautsilus Scientific Center, 2001.*

Hans B. Kief, NC/CNC Handbuch, 1995, Forward and pp. 296-297 and 318-319, Carl Hanser Verlag Publishers, Munich, Germany.

Josef Hubl, SPS/IPC/Drives—tagungsband, pp. 88-95, Nov. 23-25, 1999, Numberg, Verlag Huthig GmbH, Heidelberg, Germany.

Hans B. Kief, NC/CNC Handbuch, 2000, Carl Hanser Verlag Publishers, Munich, Germany, p. 244; p. 254, Bild 7:Programmiermögilchkelten von SPS, p. 320, p. 326, Bild 5: Das Prinzip der maschinellen NC-Programmierung; p. 327, Bild 6: Prinzip und Informationsttuβ bei der rechnenunterstützten (maschinellen) NC-Programmierung.

DIN 66001, "Information Processing Graphical Symbols and Their Application," Deutsches institut für Normung, Dec. 1983.

Einfach und werkstattnah programmieren TR Technische Rundschau Heft 37, 1993, pp. 70-71.

Communication under Article 96(2) EPC, dated Jun. 6, 2005.

* cited by examiner

FIG. 9

METHOD FOR DEBUGGING FLOWCHART PROGRAMS FOR INDUSTRIAL CONTROLLERS

FIELD OF THE INVENTION

This invention relates to a method of debugging programs for industrial controllers, in particular motion controllers, where the user links graphical elements, in particular control structures and function blocks, with a graphical editor to form a flowchart that can be visualized on a display device.

In the industrial environment, it is known that graphical input aids and a display screen can be used for visualizing the control of the motion of a processing machine or a production machine (Hans D. Kief: NC/CNC Handbuch 2000 Hansa Verlag, p. 254, FIG. 7 and p. 327, FIG. 6). The basic elements of graphical structure diagrams and flowcharts are defined in German Industrial Standard DIN 66,001.

BACKGROUND

In addition, it is stated in the article "Visual Languages—an Inexorable Trend in Industry" (Josef Hübl, PLCs/IPCs/Drives—Convention Volume, pp. 88–95, Nov. 23–25, 1999, Nuremberg, Verlag, Hüthig GmbH, Heidelberg) that control flowcharts and data-flow diagrams for control of automation functions may be created with the help of graphical editors.

It is conventional to use debuggers as auxiliary programs for troubleshooting and error localization in programming environments (Volker Claus et al., DUDEN Informatik 2nd expanded edition. page 188, Dudenverlag, 1993).

With the debuggers available today, however, the holding points or breakpoints, necessary for user-controlled execution of the program to be tested, are converted in the processor code. Therefore, the step-by-step or successive execution of the program, which is necessary for debugging, takes place on a low level of abstraction. Thus, the program is inflexible for a user with regard to visualization, for example.

The graphical input means and graphical editors available today for programming throughout industrial controllers do not provide adequate support with regard to adaptive mechanisms for the hardware configuration on which an application is based. In the graphical editor, the user is provided only with a rigid and restricted set of programming language commands.

In addition, the graphical input means and graphical editors available today for programming industrial controllers, support either dedicated programming to control an industrial process programmable controller (PLC), or programming the motion controller of a processing machine or production machine. Creation of programs for both fields of applications is not adequately supported by the existing flowchart editors.

Another disadvantage of the flowchart editors used today for programming industrial automation functions is that the diagrams created with these editors are either converted directly to executable processor code or to ASCII code, and must subsequently be interpreted in the respective target system through a run time-intensive process. This system is not just inflexible with regard to porting and transfer of programs to other systems or machines, but also restricts the user's debugging options.

Additional disadvantages of existing flowchart editors include the fact that only a limited, rigid and inflexible library of icons is available, and that the processing sequence of icons and the corresponding function blocks is predetermined. Furthermore, existing flowchart editors frequently offer only a limited number of possibilities for formulating synchronization mechanisms, although such mechanisms are frequently required, in particular for programming applications in industrial automation.

SUMMARY OF THE INVENTION

The object of this invention is to create a method whereby adequate debugging mechanisms are made available to the user for each abstraction level in the program development process. This object is achieved due to the fact that the following process steps are carried out:
 a) preparing a debugging process based on the flowchart.
 b) assigning a suspend command to each graphical element.
 c) starting the debugging process.
 d) continuing the program sequence until a suspend command is reached.
 e) visualizing the location of the current element in the flowchart for the user.
 f) proceeding to the next possible suspend command.
 g) repeating steps d) through f) until the user reaches the end of the flowchart.

Through the invention, the user may investigate the performance or defective performance of a program sequence on a graphical flowchart level.

The breakpoints necessary for the operation of a debugging program are usually placed on the processor code level; that is, they are inserted into the processor code by a compiler. However, with the present invention, the breakpoints are assigned to the flowchart elements in the form of suspend commands. Therefore, the introduction of the breakpoints takes place at a high language level.

With the present invention, a user can perform the debugging in single-step mode or in breakpoint mode, because a suspend command can also be pre-assigned through variable values, conditions or memory addresses. The program sequence is "suspended" (stopped) or not as a function of these pre-assignments.

In both modes, the user can follow the debugging process visually on the display screen as he or she works through the program. The current graphical element can be displayed by a cursor, for example. There are other possible ways to visualize the process.

In an advantageous embodiment of the present invention, the task to which a graphical element has been attached, which has been stopped by a suspend command, can be continued with a task control mechanism of the run time system. The task control mechanism can be operated by the user by entries in the engineering system (in the single-step mode and/or in the breakpoint mode), but it can also be controlled by programs of the run time system. For example, regression tests can be performed in this way.

In another advantageous embodiment of the invention, the user may operate a resume command in the engineering system, thereby advancing the current suspend command by means of the task control mechanism of the run time system. The user may, thus, perform single-step debugging by a simple operation of the resume command of the flowchart level.

In another advantageous embodiment of the present invention, the task control mechanism of the run time system is used in the form of breakpoint debugging by means of variables which can be pre-assigned by the user in the engineering system. In this way, the user can set breakpoints in a convenient manner and can perform breakpoint debugging at the flowchart level.

In another advantageous embodiment of the present invention, other programs in the run time system can pre-assign the variables in the task control mechanisms. This facilitates automatic testing of programs (e.g., automatic regression tests).

In another advantageous embodiment of the present invention, the following steps are carried out in succession:

a) generating textual language from the flowchart, b) converting the textual language in a processor-independent pseudo-code, c) loading the processor-independent pseudo-code into the controller, d) converting the processor-independent pseudo-code into executable processor code.

That textual language is generated from the flowchart diagrams in an intermediate step, provides the user the option of performing plausibility checks at this level of the textual language. However, the user can also tie other language elements already present in the textual language to the application. Since the textual language is converted in a processor-independent pseudo-code in another intermediate step, the aforementioned flexibility for the user is largely retained. The user can also perform plausibility checks or debugging at this pseudo-code level. The processor code that ultimately runs in the controller is generated from the processor-independent pseudo-code, so the target of the application is not specified until a later point in time. Furthermore, different target hardware units can easily be operated due to the intermediate steps in generation of the code.

In another advantageous embodiment of the present invention, a debugging interface is made available to the user at the level of the textual language and/or at the level of the pseudo-code and/or at the level of the processor code. The user may debug programs in the respective code level in the abstraction level to which it belongs. A user may select a suitable abstraction level for debugging in accordance with his or her level of training or experience. Furthermore, certain types of errors occur more or less frequently on different code levels. Due to the possibility of debugging on different code levels, a user can conduct a specific search for errors typical of the respective code level. Troubleshooting and error localization, thus, become more efficient.

In another advantageous embodiment of the invention, adequate programming language commands are made available for the user in the flowchart editor for each basic machine design and/or hardware configuration. This provides a programming environment, that is adapted to the basic hardware and, thus, meets the existing requirements and boundary conditions in an optimal manner. The library of icons of the flowchart editor will be automatically adapted to the given hardware specifications, e.g., the basic machine configuration.

In another advantageous embodiment of the present invention, additional graphical elements containing the function interface of corresponding subprograms may be generated in a flowchart representation. The elements are generated automatically from user-defined subprograms of a textual language by means of a converter in the manner of a compiler. This enables the machine manufacturer to generate icons and the respective masks of systems and to make them available to the user in the flowchart editor from existing subprograms of the textual language or from additional subprograms introduced into the textual language.

The function interface and the transfer parameters of the subprograms of the textual language are generated automatically for the flowchart icons. Due to these mechanisms, original equipment manufacturers may transfer subprograms that are already prepared in textual language into the flowchart editor. Thus, an adapted and expanded library of icons is made available to the end user for flowchart programming.

For manufacturers and distributors of flowchart editors for programming of industrial controllers, this also yields the advantage that they can provide the flowchart editor with a basic provide of graphical language elements, which may then be adapted to the demands of the user as a function of any existing subprograms of the textual language. A flowchart editor can, thus, be supplied to customers in an adaptable standard version or basic version (economies of scale). For the user, this yields the possibility of technological scaling for his respective applications with respect to the library of graphical elements available to him or her.

In another advantageous embodiment of this invention, the automatically generated graphical elements may be used as language elements of the flowchart. This increases the library of flowchart elements available to the user, i.e., icons, due to the fact that these automatically generated icons can be used as normal language elements of the flowchart editor. It also increases the user's flexibility and ease of expression with regard to programming of applications.

In another advantageous embodiment of this invention, the textual language is "structured text" according to the international standard IEC 6-1131 (International Electrotechnical Commission, 1992, Programmable controllers—Part 1: General information, IEC 61131-1, standard published by International Electrotechnical Commission). Due to the fact that IEC 6-1131 is a standardized language at the level of the textual language, it is readily possible to exchange it or combine it with other programming systems. In addition, when IEC 6-1131 is used as an intermediate language, it becomes easier to port to different target systems.

In another advantageous embodiment of the invention a user can shift between textual language, contact plan and/or the function plan as forms of representation for expressing conditions as desired, since IEC 6-1131 is used as textual language at the structured text level. This provides increased flexibility for the user, and is an advantage in particular for formulating conditions, because the user can select the form of representation or description in which he or she is most experienced or which is most appropriate to the underlying problem. A user will generally use contact plans and/or function plans for representing binary links and structured text for formulating arithmetic calculations.

In another advantageous embodiment of the present invention, at least one loop and/or at least one parallel branch may be used as a language element in the flowchart view. In the flowchart editors conventionally used today, loops and frequently also branches are represented with the help of jump marks. However, the use of jumps and the respective targets marks may render the program design complicated and difficult to reproduce (a "Go To problem"). That loops and parallel branches are available to the user as separate language elements makes it easier to develop and read the programs.

In another advantageous embodiment of the present invention, the individual commands are started in the same interpolator cycle within the respective parallel branch. All the branches of the parallel branch language function are operated in the same interpolator cycle, making it is possible to perform quasi-parallel processing of the commands contained in the individual branches of the parallel branch construct. In addition to sequential processing, therefore, parallel processing of commands is also made possible and is supported by adequate programming language commands in the programming environment for the user.

In another advantageous embodiment of the present invention, the parameters for function blocks may be set by mask input in the flowchart view. Thus, the user may set parameters in a way that is simple and easy to understand. For each type of function block there are standard masks, which only allow a user to make the parameter inputs that are possible for the current type. The risk of defective inputs is reduced by this context sensitivity.

In another advantageous embodiment of the present invention, function blocks are combined into modules in the flowchart view. These modules also appear as function blocks. This increases the simplicity of program execution in the flowchart for the user. A user can combine function blocks that belong together logically into one module, and can encapsulate them there, in which case this module also appears as a function block in the flowchart editor, that is, as an icon. However, this mechanism of combining and encapsulation does not merely make it simpler to run the program, but also allows for the program to be structured in this way.

In another advantageous embodiment of the present invention, modules are interleaved in the flowchart view. This means that a module may contain one or more modules as an element. Modules may subsequently be used as "subprograms" in other modules, thereby, increasing the simplicity and structure of the program execution in the flowchart.

In another advantageous embodiment of the present invention, the user may employ multiple instructions in the function blocks for the allocation of variables in the flowchart view. The user can enter multiple variable instructions in succession into one function block, that is, into one icon, and does not need a new function block for each variable instruction. The user can also perform variable instructions, which logically belong to this function block, bundled in this one function block, which increases comprehensibility and supports the programming principle of high cohesion.

In another advantageous embodiment of the present invention, the function blocks representing the functions that require a certain amount of time, contain progression conditions in the flowchart view. Functions that claim a period of time include, for example, an approach to reference points, acceleration or axial positioning. Such functions and their interaction can be synchronized by the user with the help of the progression conditions. Thus, with the help of the progression conditions, a user has access to a synchronization mechanism that allows synchronized complex motions and relationships among multiple axes.

In another advantageous embodiment of the present invention, the graphical elements of the flowchart are automatically positioned. When a user wants to represent a new icon in the flowchart editor, it is automatically positioned at the point that is the next in order to correspond to the logical program sequence. This increases the user's efficiency, since one does not have to position the icons that one has generated.

In another advantageous embodiment of the present invention, the icons of the flowchart are automatically linked together. This also increases the operating efficiency of the user because the icons need not be linked together manually.

In another advantageous embodiment of the present invention, the flowchart may be shown in a reduced or enlarged form in the display. Due to this zoom function, the diagrams are easier to comprehend for the user, and furthermore, when the user is interested in certain program sequences, he can emphasize them graphically by enlarging them.

In another advantageous embodiment of the present invention, re-translation back into flowchart representation is possible because of markings in the textual language. Due to the use of syntactical and geometric information in the form of markings, it is possible to perform such reverse translation from the textual language into the flowchart view. The reverse translation option has the advantage for the user that changes entered at the level of the textual language can be implemented directly in the flowchart view through the flowchart editor and then become visible for the user in the flowchart diagrams. The user can then further process such retranslated programs with the help of the flowchart editor on the graphical level, and can subsequently generate control code from the said reconverted programs in the remaining procedure.

In another embodiment of the present invention, steps a) through c) as set out above, are triggered in a collective step. Thus, the actual debugging process does not have to be initiated by the user in a separate operation after preparation and assignment of the suspend commands to the graphical elements.

In another embodiment of the present invention, the current graphical element is characterized visually on the display device during processing of the flowchart program. A user can, thus, follow the program sequence in the flowchart and, thus, a positive as well as a negative performance of the program can be visually detected.

The essential advantages achieved with the present invention, thus, consist in particular of the fact that a user is adequately supported in three aspects in troubleshooting and in the program test on the abstraction level of flowcharts: during program observation; during single step processing and when using breakpoints for which parameter can be set.

Another advantage of the invention is that icons that automatically contain the function interface of the corresponding subprograms are generated for the flowchart editor from subprograms present in the textual language. If an original equipment manufacturer has already generated programs in the textual language, these subprograms can automatically expand the library of icons of the flowchart editor through corresponding icons.

Another advantage is that a user can program both motion control functions and process control functions (programmable controller functions) in an appropriate form in a uniform programming environment. In addition, it is advantageous that the programming environment is project-sensitive, i.e., that additional dedicated language elements are made available to the user, depending on the underlying hardware or machine design.

Another advantage is that the user may use sequential as well as cyclical programming of control sequences. Since the user has access to interleaved module formation of function blocks, the program structure may be simplified and improved, because design criteria, locality and high cohesion can easily be implemented.

BRIEF DESCRIPTION OF THE FIGURES

One embodiment of this invention is illustrated in the drawings and explained in greater detail below.

FIG. 9 shows a selection of language elements (icons) of the flowchart editor.

DETAILED DESCRIPTION OF THE INVENTION

Figure 1:
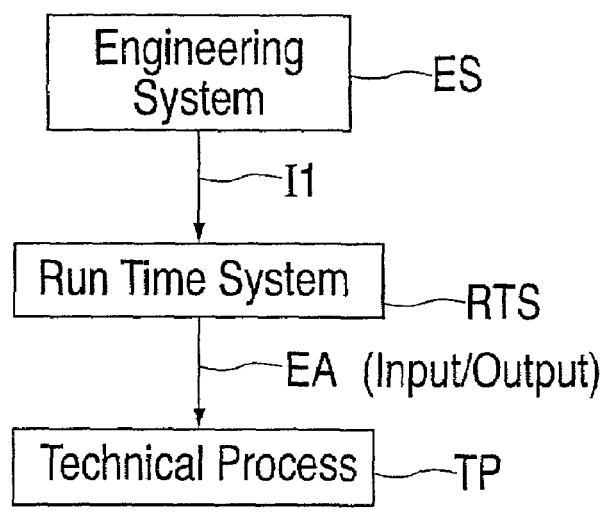
FIG. 1 shows an engineering system, the respective run time system and the technical process to be controlled in a schematic diagram.

In FIG. 1, a block diagram shows that a technical process TP is controlled by the run time system RTS of an industrial controller. The connection between the run time system RTS and the controller, and the technical process TP, is bi-directional over the input/output EA. Programming of the controller and, thus, the specification of the behavior of the run time system RTS takes place in the engineering system ES. The engineering system ES contains tools for configuring, designing and programming machines, and for the control of technical processes. The programs generated in the engineering system are sent to the run time system RTS of the controller over information path I1. With regard to its hardware equipment, an engineering system ES usually comprises a computer system with a graphical display screen (e.g., a video display unit), input means (e.g., a keyboard and mouse), a processor, working memory and secondary memory, a device for accommodating computer readable media (e.g., diskettes, CDs) and connection units for data exchange with other systems (e.g., other computer systems, controllers for technical processes) or media (e.g., the Internet). A controller usually comprises input and output units as well as a processor and program memory.

The run time system RTS contains a task control mechanism, which is used in debugging flowcharts. The task control mechanism may be provided with information by the engineering system ES, for example. In particular, it is the function of the task control mechanism to operate the resume commands to cause program execution to continue.

Figure 2:
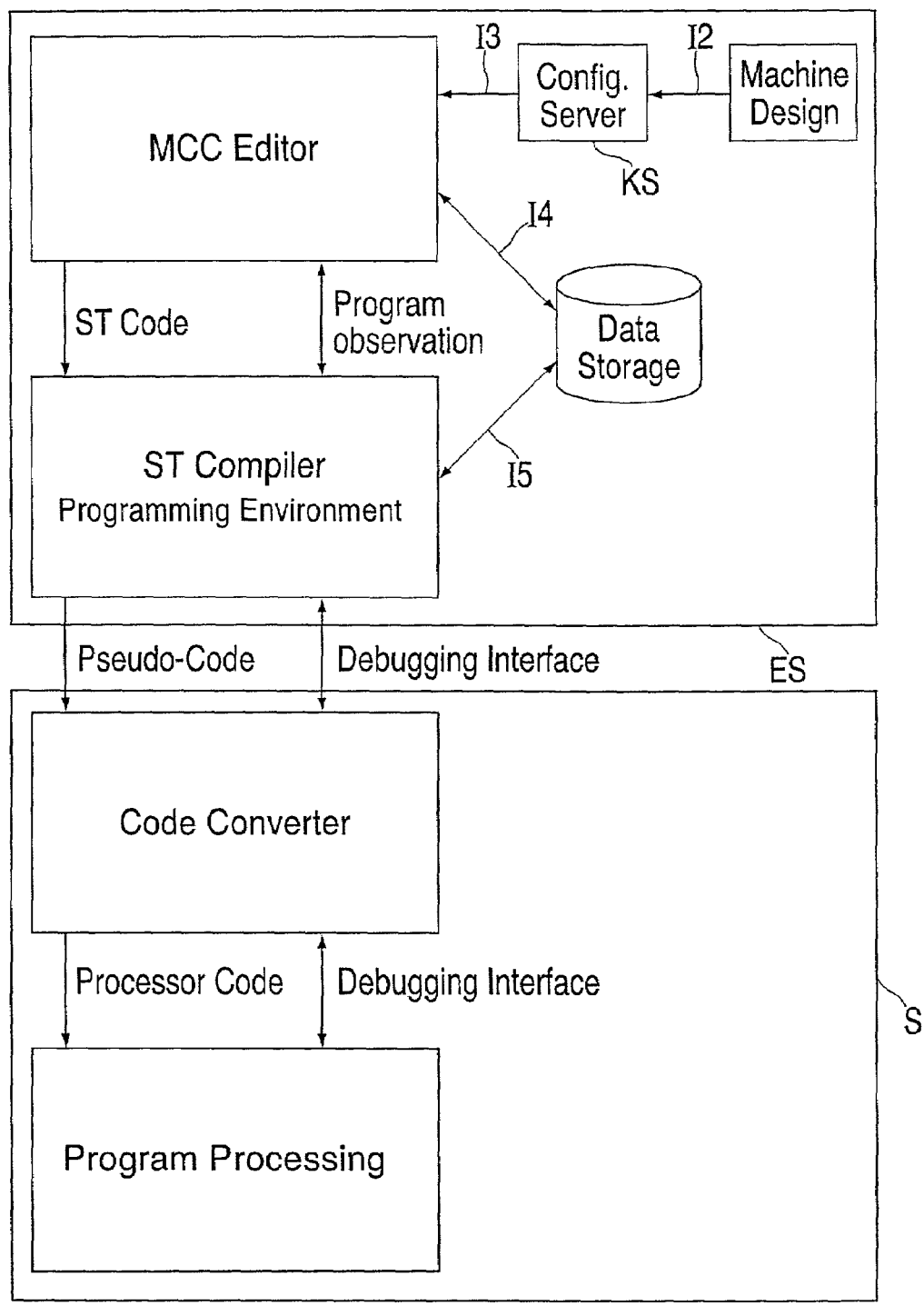
FIG. 2 shows elements of the engineering system and the controller and their interrelationships in a survey diagram.

In FIG. 2, elements of the engineering system and the controller and their interaction are illustrated in a survey diagram, where the individual elements are represented in the form of rectangles, and the data storage contained in the engineering system is represented in the form of a cylinder. Arrows (unidirectional or bi-directional) indicate the logical relationships among the elements in terms of data and sequence. The top half of FIG. 2 shows the elements of the engineering system, namely, the motion control chart (MCC) editor, the structured text (ST) compiler with programming environment, the configuration server KS and the machine design, as well as data storage. That these elements belong to the engineering system is indicated by the border around them. The controller contains a code converter and program processing. The elements of the controller, which are in the lower section in FIG. 2, are outlined. Both the engineering system and the controller may also contain other elements, but, for simplicity, these are not shown.

The graphical program sequences are generated in the MCC editor. The language elements of the editor, i.e., the icons, can be generated and represented by means of a command bar on the display screen, which is operated with the help of a mouse or other possible input means. With the help of the MCC editor, a user can link function blocks (icons) and control structures to form a flowchart, that is, the MCC editor can be used as a graphical programming tool for generating programs for motion controls and/or process controls. A text program and a textual language (usually structured text according to IEC 6-1131) are generated from the flowchart. This structured text code (ST code) is converted by the structured text compiler (ST compiler), which is part of the programming environment in a processor-independent pseudo-code. This pseudo-code is loaded onto the controller where it is converted to executable processor code by the code converter. This process code is executed by the program processor within the controller. The unidirectional arrows in the left section of FIG. 2 represent the steps in code conversion or program conversion. In parallel with the three unidirectional arrows running from top to bottom, representing this conversion, three bi-directional arrows representing debugging interfaces and the possibility of program observation, run between the following elements: the MCC editor, the ST compiler, the code converter and the program processing. Between program processing and code converter there is a debugging interface on the processor code level, i.e., on the object code level, and another debugging interface is placed between the code converter and the ST compiler. This debugging interface is on the pseudo-code level. Between the ST compiler and the MCC editor there is another debugging interface or program observation interface at the structured text level (ST code).

A user may debug programs in the respective code level and in the respective abstraction level, and a user will be able to select a suitable abstraction level for debugging in accordance with his training or experience. Certain types of errors occur more or less frequently at each code level. Due to the possibility of debugging on different code levels, a user can search, in a systematic manner, for errors typical of the respective code level. Troubleshooting and error localization are, thus, made more efficient.

As additional elements of the engineering system, FIG. 2 shows the machine design and a configuration server KS. In the machine design, the design of the hardware or the underlying machine is completed with the help of suitable tools, in other words, e.g. the types of axes present and the quantity specified in the machine design. This information is fed into the MCC editor through the configuration server KS. The transfer of this information is represented by the unidirectional arrows I2 and I3. In addition, the configuration server KS also contains other relevant configuration information for the system, which can also be used, for example, for licensing the respective software components.

The data storage DA, represented by a cylinder, contains three things: first, the object model generated by the MCC editor for a flowchart; second, the respective structured text; and third, the content of the data storage DA, which is the pseudo-code generated from the structured text. The data storage DA is in bi-directional connection with the MCC editor and the ST compiler, represented by the bi-directional information arrows I4 and I5.

Figure 3:
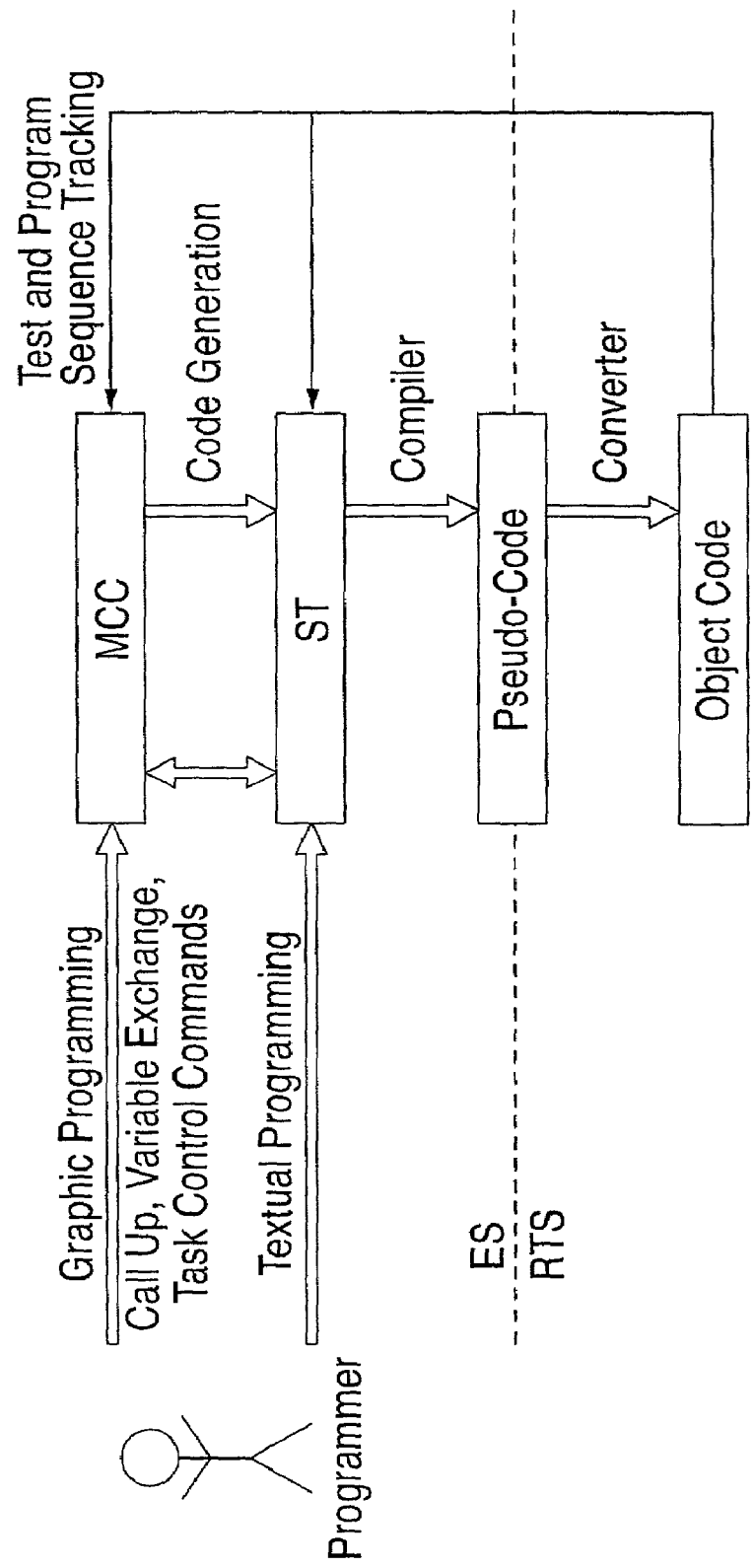
FIG. 3 shows the technical program relationship between elements of the engineering system and the run time system, also in the form of a survey diagram.

FIG. 3 shows the existing abstraction levels from the standpoint of the program code as a survey diagram. The different program code levels are illustrated as rectangles.

The top level is the MCC level, where the flowchart programs are generated. The next lower code level is the structured text level ST. One reaches the ST level from the MCC level by corresponding code generation as represented by an arrow from the MCC block to the ST block. Beneath the structured text level ST is the pseudo-code level. A processor-independent pseudo-code is converted by a converter from the structured text program, as represented by the arrow from the ST block to the block bearing the name pseudo-code. Beneath the pseudo-code level is the lowest code level, namely, the object code level which contains the processor code that can be executed. The object code is generated from the pseudo-code by a converter, also represented by an arrow from the pseudo-code block to the object code block. Arrows bent at a right angle lead away from the object code level back to the structured text code level ST and to the flowchart level MCC. This indicates that test activities and program tracking activities can take place on these levels on the basis of the object code. The bold double arrow between the MCC level and the ST level indicates that calls, task control commands and variable exchange functions can be sent between these two levels. The dotted line in FIG. 3 shows the borderline between the engineering system ES and the run time system RTS of the controller (S; FIG. 2). This borderline runs through the pseudo-code level, and everything above the dotted line belongs to the engineering system ES, while everything below the dotted line belongs to the run time system RTS.

In addition, FIG. 3 shows how a programmer or a user (represented by a stylized stick figure at the left edge of the figure) can introduce entries into the engineering system ES. The user can generate flowcharts on the MCC level with the help of graphical programming, or generate programs on the structured text level ST by text programming. Both input options are represented by arrows leading from the stick figure to the MCC block or to the ST block.

Figure 4:
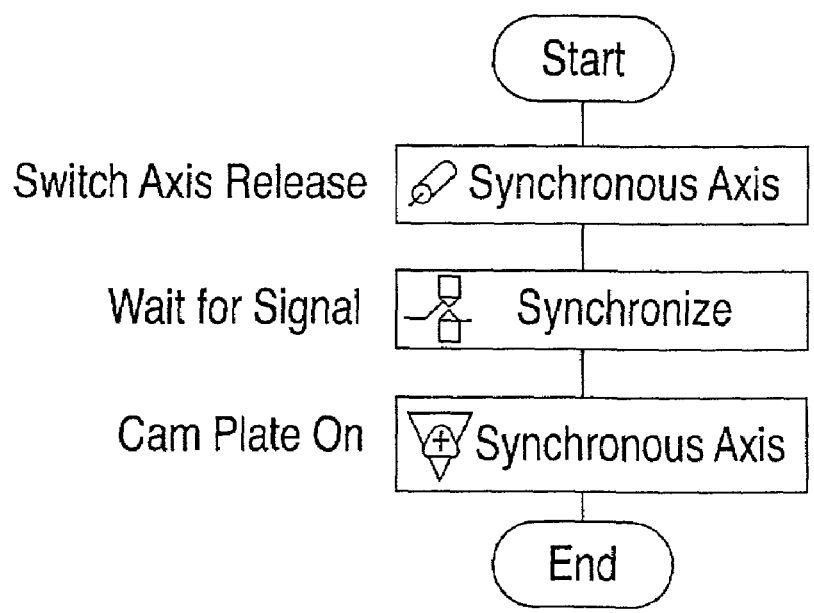
FIG. 4 shows a simple diagram in flowchart representation.

The diagram according to FIG. 4 shows a simple program sequence for programming axial motions. Each flowchart begins with a start node and ends with an end node. These program limiting symbols bear the designations "start" and "end," respectively. Start symbols and end symbols are each represented by a rectangle with the end faces designed as semicircles. The program commands are represented by rectangles that contain a written command and a graphical symbol representing the stored command.

The flowchart symbols are usually generated by using an input bar with the help of a mouse in the flowchart editor, but other input means such as a touch pad are also conceivable. Alternatively, the system might be operated by means of a keyboard, with or without a mouse.

As a default, the flowchart symbols are directed at one another by the flowchart editor and are linked together by a line.

A synchronous axis is enabled after the start. Then the system waits for a synchronization signal. As the next and final command of the flowchart, a cam plate is turned on for the synchronous axis. The command sequence of FIG. 4 is terminated by the end symbol.

When a user wants to debug the existing flowchart, that is, perform troubleshooting and error localization or checking the performance of the program, he or she will start a debug mode that causes suspend commands to be assigned to the individual graphical elements of the flowchart. The user can then perform the debugging in single-step mode or in the breakpoint mode In the single-step mode, the program is executed automatically after starting the debugger from the suspend command to the next suspend command. The debugger can be regarded as a utility program of the programming environment including the engineering system (ES; FIGS. 1, 2 and 3). Each time a suspend command is reached, the program execution stops. When a suspend command is reached, the respective graphical element is displayed visually for the user (e.g., through a special cursor or color code). The suspend commands are "released" by corresponding resume commands. The user can, thus, cause program execution to continue. Program execution can also be continued by a task control mechanism of the run time system.

However, conditions, variable values or memory addresses can also be assigned to a suspend command. Then the program execution is determined by the value of these allocations. In this way, debugging can also be performed in the breakpoint mode with the help of the suspend commands.

Figure 5:
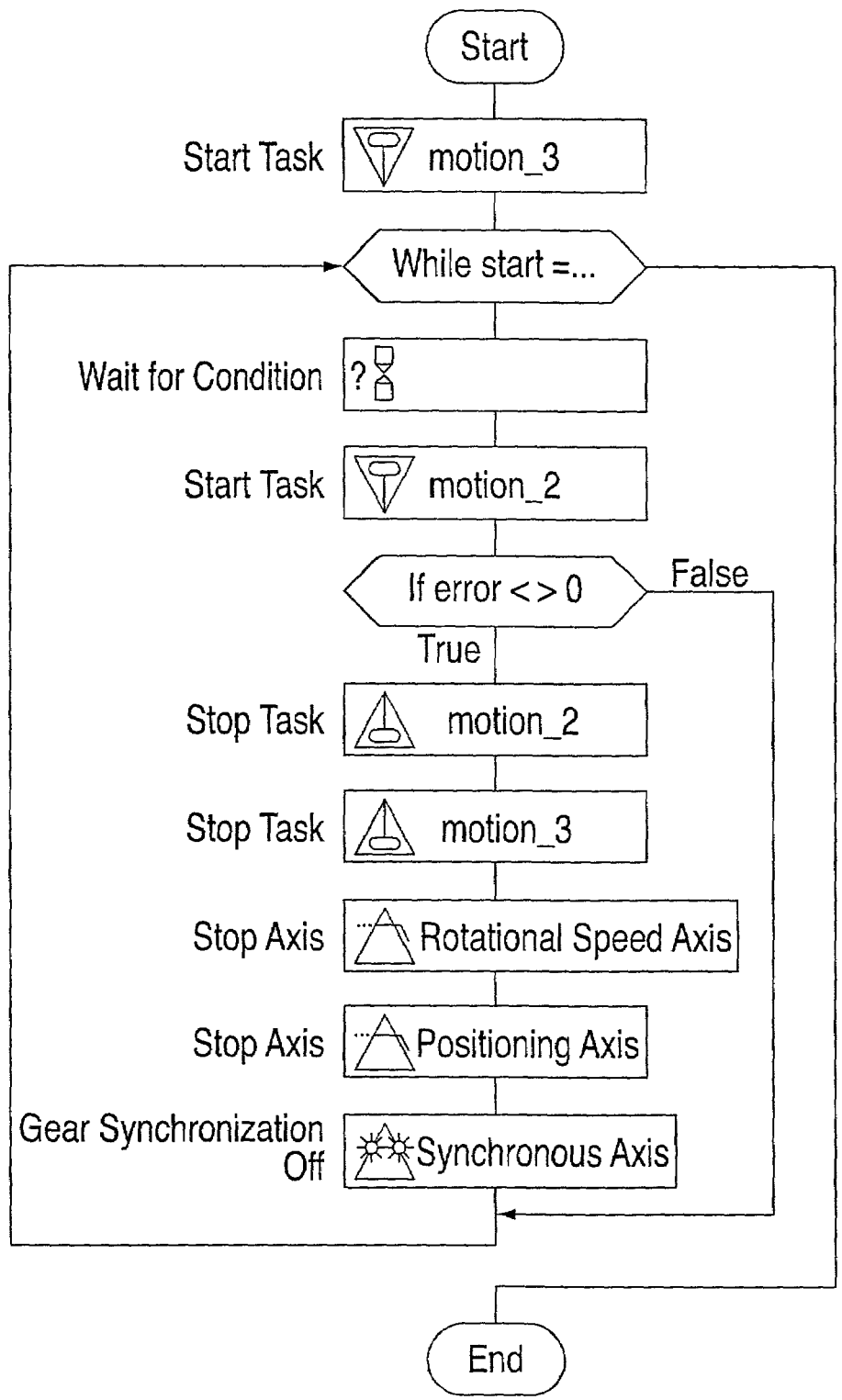
FIG. 5 shows a complex diagram in flowchart representation with the control structures WHILE and IF, FIG. 6 also shows a complex diagram in flowchart representation with the language function parallel branching (sync)

The diagram of FIG. 5 shows a complex flowchart with control structures for a WHILE loop and for the IF statement. The WHILE and the IF statements are each represented by hexagonal honeycomb-shaped symbols. Otherwise, the same types of symbols as those already known from FIG. 4 are used in the program run as illustrated in FIG. 5. The flowchart begins with the start symbol and ends with the end symbol. Immediately after the start node, there is a command that starts the task "motion_3." This command is of the "start task" type. Therefore, the rectangle for this command also contains the respective corresponding symbol representing the starting of a task. The hexagonal honeycomb-shaped WHILE statement follows next in the program sequence. As long as the condition indicated in the WHILE statement is true, the commands following the WHILE statement are executed cyclically in succession. The end of the command sequence of a WHILE loop is represented by an angled arrow leading down from the last symbol of the WHILE statement (this is the command of the type "gear synchronization off" based on a synchronous axis) and leading back to the WHILE statement on the left side of the figure. If the condition in the WHILE statement is no longer met, then the command sequence belonging to the statement is no longer executed. This is illustrated by a rectangular connecting line leaving the WHILE symbol on the right side and bypassing the sequence of symbol commands belonging to the WHILE symbol on the right side and opening into the symbol directly following this command sequence, which is the end symbol.

However, if the WHILE condition is met, the following command sequence is processed: immediately after the WHILE statement and on, follows a command that represents waiting for a condition. This command also contains a corresponding mnemonic graphical signal representing the waiting process graphically. This is followed by a command that starts the "motion_2" task. This command is also of the "start task" type and contains the corresponding graphical symbol. This command is followed by the IF statement, which is illustrated similarly to the WHILE statement by a hexagonal honeycomb-shaped symbol. If the IF condition is met (represented by "error<>zero"), then the command sequence is further processed in the True branch. Otherwise, if the condition is not met, the command sequence in the False branch is further processed. The next command in the True branch of the IF condition is a command that stops the "motion_2" task. This command is of the "stop task" type. It is followed by a command that stops the "motion_3" task. This command is also of the "stop task" type. These commands are also represented by the respective corresponding symbols. Next in the command sequence are two "stop axis"

commands. In the first such command, a rotational speed axis is stopped, and in the following command a positioning axis is stopped. These "stop axis" commands are also represented by corresponding graphical symbols. The next and last command relates to an axis with the name "synchronous axis", namely, the disconnection of the gear synchronization ("gear synchronization off"). The symbols of the flowchart are connected by lines, thus representing the program sequence. An arrow bent at a right angle leads away from this command, representing the last command in the WHILE statement, and goes back to this WHILE statement. This represents the cyclical processing of the command sequence. In the WHILE statement, a check is performed to determine whether the condition is met. If it has been met or continues to be met, the command sequence is run once again. If it has not been met, the program leaves the WHILE statement and continues with the end symbol, i.e., the program run represented by the flowchart is ended.

Suspend commands can also be assigned to the flowchart according to FIG. 5 for the purpose of debugging.

Figure 6:
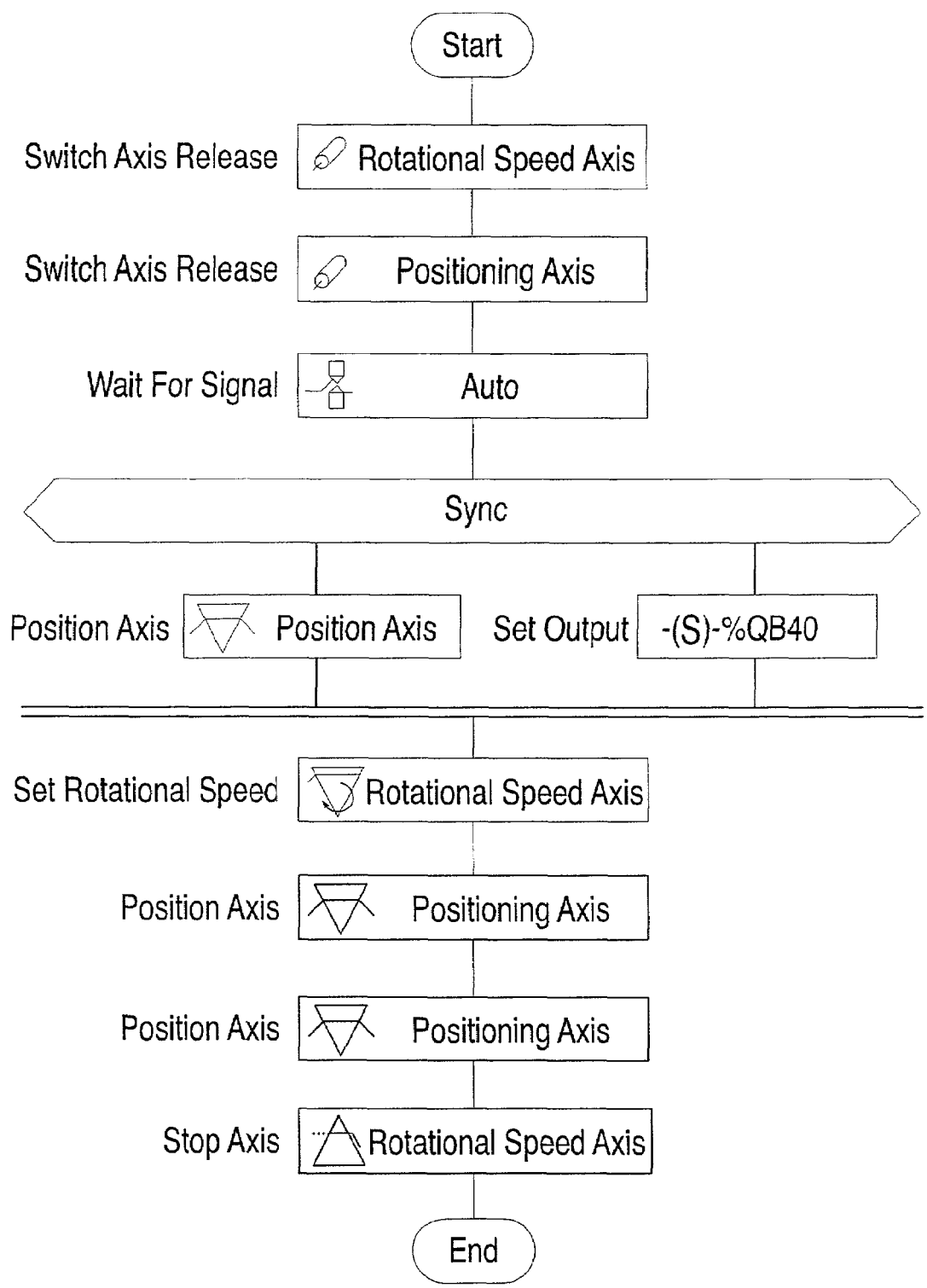

FIG. 6 shows a complex diagram in flowchart representation with the parallel branching language construction (sync). The start symbol is followed by a command that relates to a rotational speed axis, namely, "switch axis release." For this command, a graphical symbol representing this command is also shown in the command rectangle. This is again followed by a command of the type "switch axis release", but this time it relates to a positioning axis; here again, the respective corresponding symbol is given. The following command is a synchronization command "wait for signal", designated as "auto" and provided with the corresponding symbol. The symbol for the parallel branch (sync) follows as the next symbol. This symbol, like the WHILE and the IF statements, is also represented by a hexagonal honeycomb-shaped graphical element. All the commands arranged in the sector directly beneath the symbol for the parallel branch start in the same interpolator cycle. This includes the "position axis" command, based on a positioning axis (this type of command also includes the respective corresponding graphical symbol) and a command of the "set output" type. The "set output" type of command is also illustrated by a rectangle, this rectangle containing the address of the output (% QB40) and the corresponding symbol for this set command (S stands for set). The commands belonging to a parallel branch symbol, that is, the commands that start within the same interpolator cycle, are connected with a line upward to the parallel branch symbol and at the bottom they are connected by a double line.

This horizontal double line indicates that parallel processing has been stopped again and a program will wait to process the following command until all the actions in the parallel branch are concluded. Thus, this is also the end symbol of the parallel branch construction. This is followed next by a command of the "rotational speed set-point" type, which relates to a rotational speed axis. This is followed by two commands of the "position axis" type, each based on positioning axes. This is again followed by a command of the "stop axis" type, which relates to a rotational speed axis. The rectangle representing these commands, also contains the corresponding respective graphical symbols. After a command of the "stop axis-type which relates to the aforementioned rotational speed axis, follows the end symbol.

The type of flowchart programming shown here supports different types of programming. First, a more or less true parallelism is achieved through the parallel branch symbol with the start of the respective commands in an interpolator cycle, that is, programming of parallel threads is supported and the respective processing is enabled. Secondly, cyclic programming and cyclic program processing is supported. This means that it is possible to show that only successive commands are initiated, and that it is not necessary to wait for processing of the preceding command. It would also be possible to program and illustrate such sequential processes, namely, on initiation of a command to wait for processing of this command until the next command is initiated and processed. The flowchart programming presented here is, thus, flexible in the way it can be applied by a user and used for different applications.

Suspend commands can also be assigned to the flowchart according to FIG. 6 for the purpose of debugging.

Figure 7:
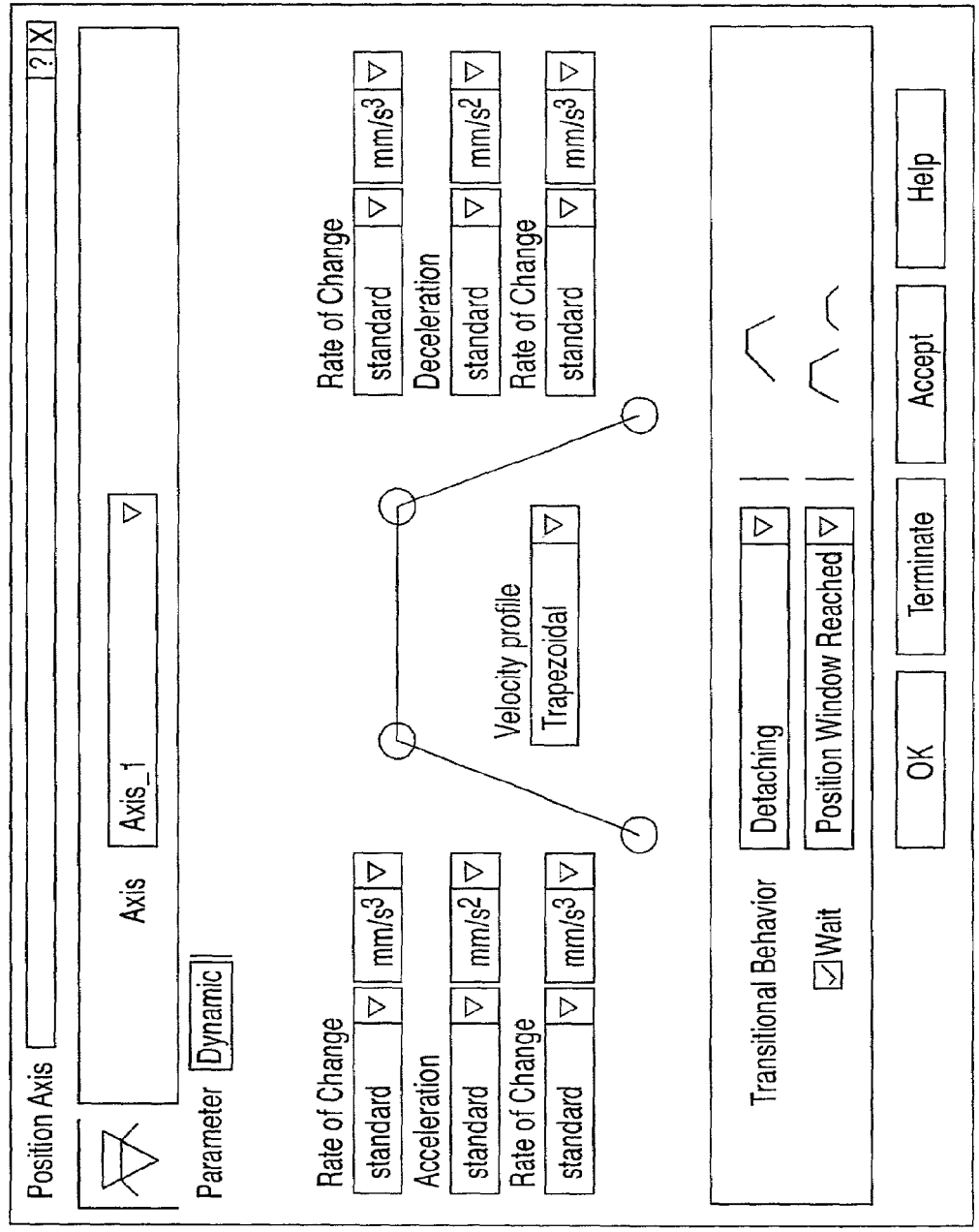
FIG. 7 shows a mask for setting parameters for the command "position axis,"

FIG. 7 shows a mask for setting parameters for the "position axis" flowchart command. The designation of the corresponding command, namely, "position axis" in this case, is located in the upper left of the upper bar of the mask. The upper bar also contains two switches on its right side. The switch with a question mark provides online help, and the second switch (which is labeled with an x) is used for closing the mask. The mask with which parameters are set (the parameterization mask) includes different input sectors. In the top input sector, the corresponding axis can be selected. With the help of an input menu (represented by an input button with a small, upside-down triangle), the corresponding axes can be selected in the input window. At the upper left of this top sector is the graphical symbol belonging to this command, an upside-down triangle with a dark horizontal line at the center, and other small lines angled downward at each end of this line. The next and largest sector of the parameterization mask represents the possibility of parameter input. The parameters differ according to the command. They are sorted logically by means of task bar options that are arranged on a task bar, as is customary in the conventional program interfaces. The first page (in FIG. 7 this page can be masked out by the "parameter" task bar option) usually contains the parameters that absolutely must be indicated for setting of parameters of the command. An unconditional parameter for the "position axis" command would for example, be the target position of an axial motion.

The number and significance of the task bar options also varies according to the command. It can be seen in FIG. 7 that a "dynamic" task bar option is also present for the "position axis" command in addition to the "parameter" task bar option. With this task bar option, entries regarding the rate of change and acceleration, as well as the velocity profile, can be made for the description of the dynamic behavior. These inputs can be made through input fields and respective menus. In this case, the trapezoidal shape was selected as the velocity profile. This shape has also been represented graphically in a stylized manner at the center of this input sector. In the lower input sector of the parameterization mask that follows this, additional inputs, e.g., for the transitional behavior, can be made. In this case, "detaching" was entered for the transitional behavior. In addition, waiting conditions can be entered by putting a check in the "wait" box. Additional entries for this synchronization can be made in a respective input window. In the example in FIG. 7, "position window reached" has been entered for this item. The entries are also supported by axial profiles that are represented in a stylized manner. The lower end of the parameterization axis comprises four input buttons, namely, an "okay" button, a "terminate" button, an "accept" button and a "help" button. By using these input buttons, users may either accept the entries, confirm them, discard them or call up input help. With the help of the waiting conditions, so-called step enabling conditions can be specified by a user to synchronize the functions (e.g., reference point approach or axial positioning) or their interaction.

There are particular parameterization masks for commands that can be entered and processed with the help of the flowchart editor. Thus, the user is supported in programming motion and control sequences with the help of these parameterization masks in a context sensitive manner.

Figure 8:
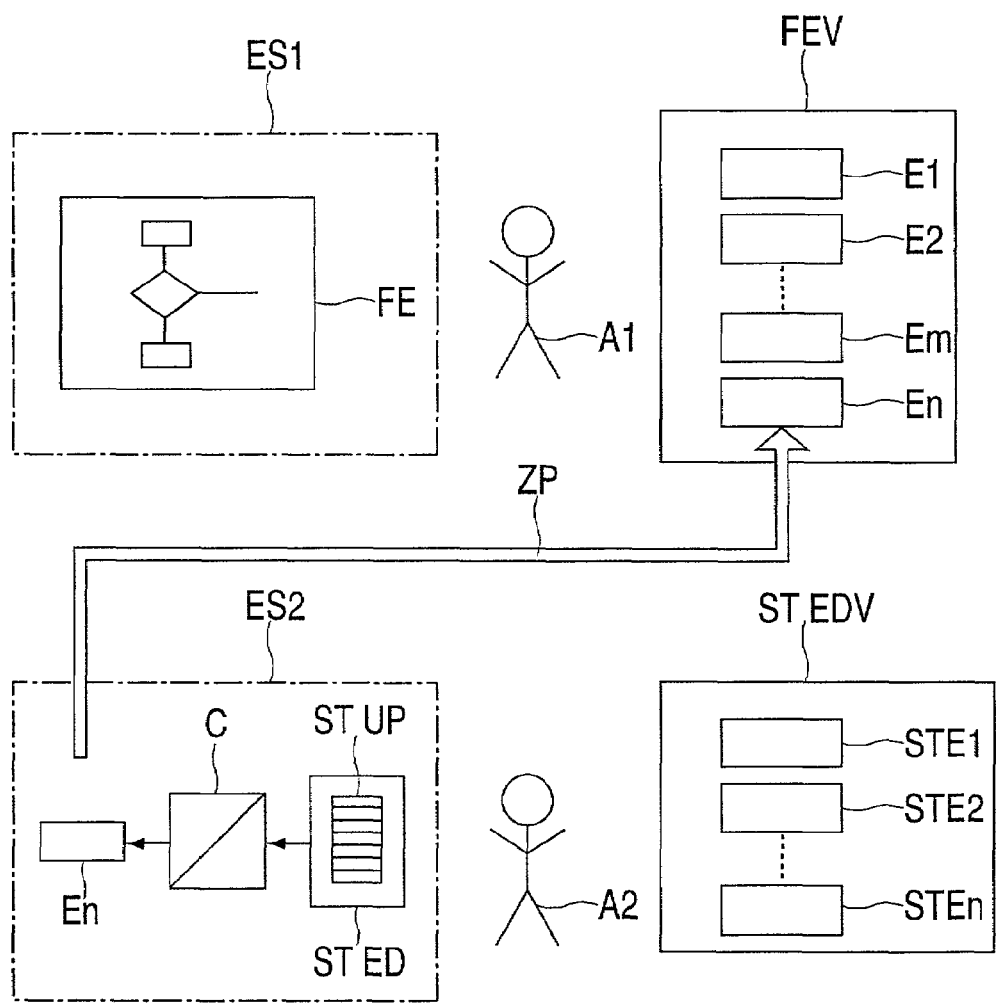
FIG. 8 shows in a survey diagram how the library of icons of the flowchart editor is expanded.

FIG. 8 shows in a survey diagram how the set of available commands FEV of the flowchart editor FE is expanded. At the outset, the graphical elements E1 to Em of flowchart editor FE are available to the user A1 (represented by a stick figure). The flowchart editor FE is represented as a rectangle containing the graphical elements indicated at the upper left of the figure. The flowchart editor FE is part of an engineering system ES1, represented by a dotted line. The engineering system ES1 also contains other elements, but, for simplicity, these are not shown. The library of icons FEV of the flowchart editor FE, which contains the graphical elements E1 to Em at the outset, is shown as a rectangle at the upper right of the figure.

The lower half of FIG. 8 shows a user A2 (also represented by a stick figure) who is working with an engineering system ES2 on the structured text level (ST; FIG. 3). At the structured text level, the structured textual language elements STE1 through STEn representing the structured text library of icons STEDV of the structured text editor are available to the user A2 within the structured text editor STED. The structured text library of icons STEDV of the structured text editor STED is also represented as a rectangle. With the help of the structured text language elements STE1 through STEn, the user A2 can create structured text subprograms STUP in the structured text editor STED. These subprograms STUP are converted to graphical language elements of the flowchart editor FE by a converter (e.g., a compiler C.)

The lower left section of FIG. 8 shows in diagram form how these graphical elements are generated. The conversion takes place within the engineering system ES2 as an example. The structured text subprogram STUP (indicated schematically by a sequence of structured text elements from the library of icons STEDV of the structured text editor) is converted by the compiler C (represented by a rectangle with a diagonal line) to the graphical element En which also contains the function interface of the original structured text subprogram. The conversion process (structured text editor|compiler|graphical element) is indicated schematically by two horizontal arrows. The allocation arrow ZP indicates that the newly generated graphical element En expands the library of icons FEV of the flowchart editor FE and is available to the user A1 for flowchart programming.

The engineering system ES2 also contains additional elements but, for simplicity, these are not shown. In the mechanism described here, functions of the engineering systems ES1 and ES2 may be contained in a single engineering system. The two users A1 and A2 may also represent a single person.

Figure 9:
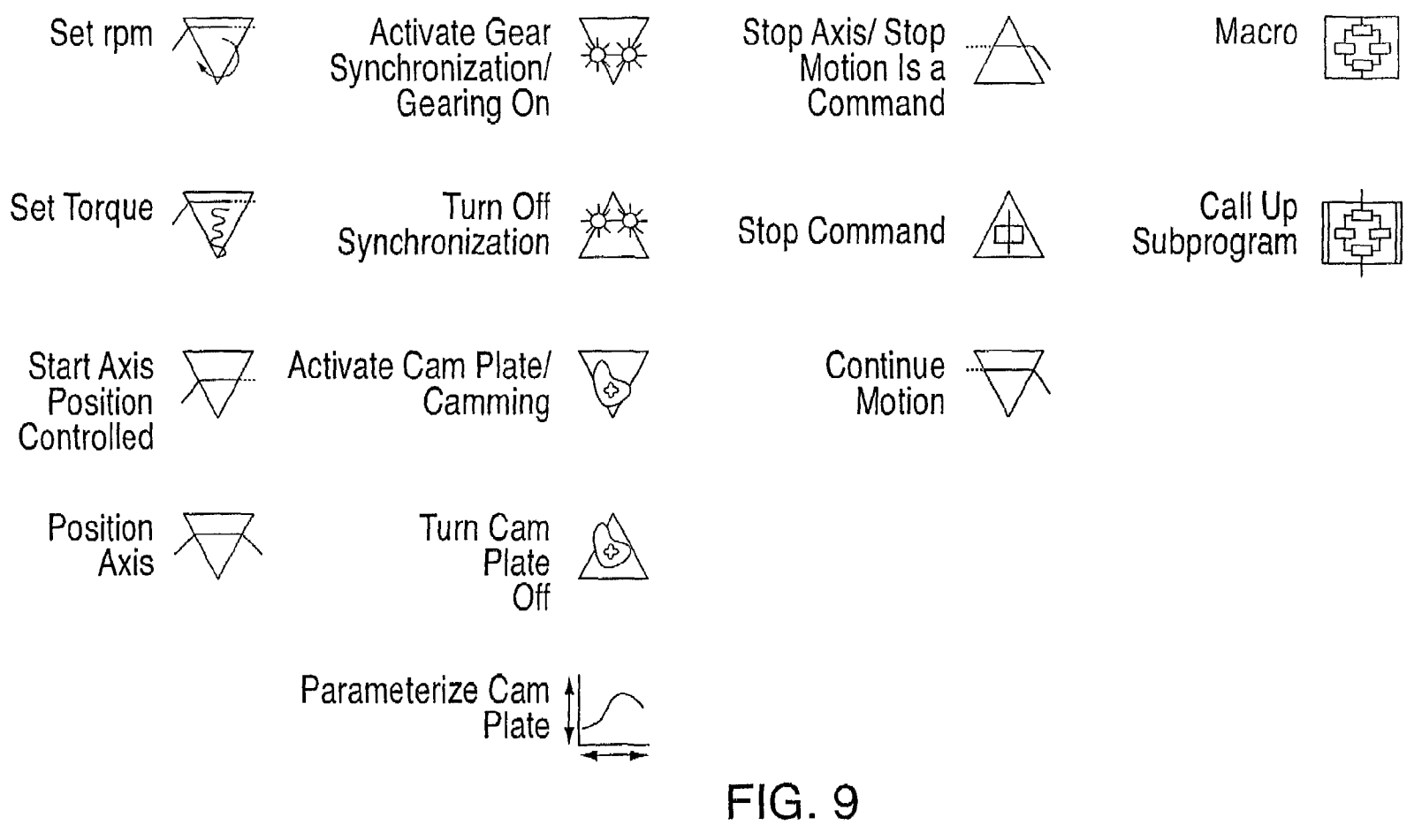

The diagram according to FIG. 9 shows a selection of language elements (icons) of the flowchart editor. These language elements represent commands that can be used for graphical programming of the flowchart editor. The motion control flowchart editor supports the following classes of commands and makes available appropriate symbols for the individual commands of the following classes: start commands, stop commands, positioning commands, synchronous and cam plate commands, probe commands, and software cam commands, wait commands, task control commands, commands for manipulation of variables and other general commands. In addition, the motion control flowchart editor makes available additional graphical control structures for the graphical program execution.

What is claimed is:

1. A method for debugging a program for an industrial controller, the industrial controller having an engineering system including an editor and further having a run time system, wherein graphical elements are linked using the editor to form a motion control flowchart that can be visualized on a display, the graphical elements corresponding to respective tasks, the method comprising the steps of:
  a) preparing a debugging process for the industrial control program based on the flowchart;
  b) assigning a suspend command to each graphical element of the flowchart;
  c) commencing the debugging process for the industrial control program;
  d) continuing the debugging process until a suspend command is reached;
  e) displaying the location of the flowchart element corresponding to the suspend command;
  f) continuing a task corresponding to a graphical element of the flowchart, that has been suspended by a suspend command, using a task control mechanism of the run-time system; and
  g) proceeding to the next possible suspend command;
  wherein a user can switch between structured textual language, contact plan and function plan as forms of representation for formulation conditions.

2. The method according to claim 1, wherein the task control mechanism of the run time system comprises breakpoint debugging and variables that can be pre-assigned by the user in the engineering system, further comprising the step of pre-assigning variables corresponding to breakpoints.

3. The method according to claim 2 wherein the variable pre-assignments in the task control mechanism are performed by programs of the run time system other than the task control mechanism.

4. The method according to claim 1, wherein a debugging interface is available to a user at levels comprising at least two of the group consisting of a structured textual language level, a pseudo-code level, and a processor code level.

5. A method according to claim 1, wherein programming language commands are provided in the flowchart editor as a function of configuration of hardware associated with an industrial controller.

6. The method according to claim 1, wherein additional graphical elements are generated in the motion control flowchart representation by converting user-defined structured text subprograms of the textual language into graphical elements comprising function interfaces of the corresponding structured text subprograms.

7. The method according to claim 6, wherein the generated graphical elements are used as language elements of the motion control flowchart.

8. The method according to claim 1, wherein structured text according to IEC 6-1131 is used as the structured textual language.

9. The method according to claim 1, wherein at least one of the group consisting of a loop and a parallel branch is present as a programming language command in the motion control flowchart view.

10. The method according to claim 9, wherein a parallel branch is initiated and wherein individual commands are initiated in a given interpolator cycle within a respective parallel branch.

11. The method according claim 1, further comprising function blocks, wherein parameters can be set for the function blocks by mask input in a display associated with the motion control flowchart.

12. The method according to claim 1, further comprising function blocks, wherein the function blocks are combined into modules that in turn are presented as function blocks in a display associated with the motion control flowchart.

13. The method according to claim 12, wherein modules are interleaved in the display associated with the motion control flowchart.

14. The method according to claim 12, wherein the function blocks for the allocation of variables in the display associated with the motion control flowchart comprise multiple instructions.

15. The method according to claim 12, wherein the function blocks representing functions that require a given period of time comprise advance conditions in the display associated with the flowchart.

16. The method according to claim 1, wherein the graphical elements of the flowchart are positioned automatically.

17. The method according to claim 1, wherein the graphical elements of the flowchart are linked together automatically.

18. The method according to claim 1, wherein the flowchart is displayed in a form comprising one of the group consisting of a reduced form and an enlarged form.

19. The method according to claim 1, wherein steps a) through c) are triggered in a collective step.

20. The method according to claim 1, wherein during processing of the flowchart program a currently processed graphical element is displayed.

21. A method for debugging a program for an industrial controller, the industrial controller having a plurality of code levels associated with at least one of an engineering system and a run time system associated with the industrial controller, wherein graphical elements are linked using an editor to form a motion control flowchart that can be visualized on a display, the method comprising the steps of:
 a) preparing a plurality of debugging processes for programming code for the industrial controller having the plurality of code levels, the programming code associated with the flowchart;
 b) conducting debugging for the plurality of debugging processes;
 c) displaying the debugging processes on respective ones of a plurality of debugging interfaces;
 d) generating a structured textual language from the flowchart; and
 e) converting the structured textual language into a processor-independent pseudo-code;
 wherein the programming code comprises a plurality of code levels, at least a subset of the plurality of debugging processes corresponds to respective ones of the plurality of code levels, and the step of displaying debugging processes comprises displaying at least a subset of the debugging processes on respective ones of the plurality of debugging interfaces.

22. The method according to claim 21, wherein the different code levels comprise at least one of the group consisting of structured text code, processor independent pseudo-code, and object code.

23. The method according to claim 21, wherein the plurality of code levels comprises a pseudo-code level and a debugging process is prepared for the pseudo-code level.

24. A method for debugging a program for an industrial controller, the industrial controller having an engineering system including an editor and further having a run time system, wherein graphical elements are linked using the editor to form a motion control flowchart that can be visualized on a display, the graphical elements corresponding to respective tasks, the method comprising the steps of:
 a) preparing a debugging process for the industrial control program based on the flowchart;
 b) assigning a suspend command to each graphical element of the flowchart;
 c) commencing the debugging process for the industrial control program;
 d) continuing the debugging process until a suspend command is reached;
 e) displaying the location of the flowchart element corresponding to the suspend command;
 f) continuing a task corresponding to a graphical element of the flowchart, that has been suspended by a suspend command, using a task control mechanism of the run-time system;
 g) proceeding to the next possible suspend command;
 h) generating a structured textual language from the flowchart;
 i) converting the structured textual language into a processor-independent pseudo-code;
 j) loading the processor-independent pseudo-code into a controller; and
 k) convening the processor-independent pseudo-code into executable processor code;
wherein re-translation back into motion control flowchart representation is possible by means of marks in the textual language.

* * * * *